Figure 1:
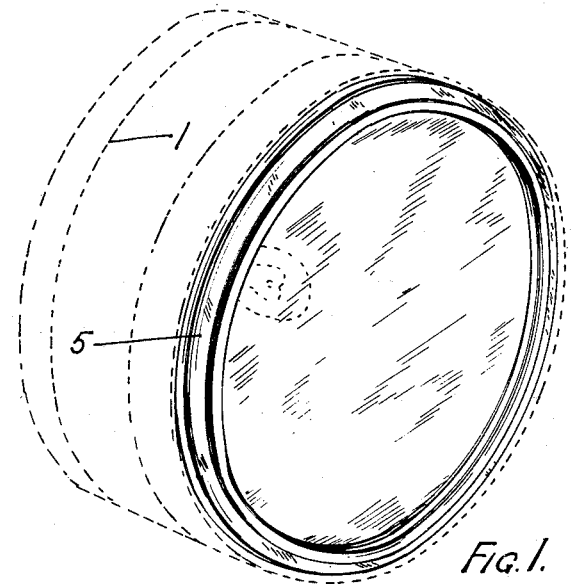

Oct. 8, 1929.                    C. HOLUB                    1,730,574

MANUFACTURE OF ARTIFICIAL LIGHT FILTERS

Filed July 13, 1926

Chas. Holub
INVENTOR

By: Marks & Clerk
ATTYS

Patented Oct. 8, 1929

1,730,574

UNITED STATES PATENT OFFICE

CHARLES HOLUB, OF BRISBANE, QUEENSLAND, AUSTRALIA

MANUFACTURE OF ARTIFICIAL-LIGHT FILTERS

Application filed July 13, 1926, Serial No. 122,251, and in Australia July 24, 1925.

This invention relates to the manufacture of artificial light filters and has for one of its objects to provide an inexpensive and ready method of manufacturing a light filter or film which when used with means for the projection of artificial light is adapted to eliminate glare and shadows likely to arise from such projection and to diffuse the light without materially reducing its range of illumination in a forward direction.

Another object of the invention is to provide an artificial light filter with the advantages previously mentioned.

And a further object of the invention is to provide means whereby the filter may be preserved and utilized generally for the filtering of artificial light.

In manufacturing filters in accordance with the invention ordinary silk fabric or artificial silk fabric is first soaked in soapy water to wash it; subsequently it is dipped in a weak aqueous solution of formaldehyde or formalin. Such solution may be a 50%-60% solution. After such dipping has taken place the dipped silk is then dried in any suitable manner. Instead of using a solution of formaldehyde or formalin for dipping the silk the latter may be dipped in a weak aqueous solution of either alum, tannic acid, gallic acid, or potassium bichromate. Such dipping treatment of the silk has the effect of hardening same.

Subsequent to the drying of the treated silk the latter is coated with a thick colloidal substance which may be prepared in the following manner and which imparts to the film or filter an appropriate greenish-blue color. A sufficiency of gelatine and water are added and both are heated and when the gelatine has melted and a thick mass is thus produced a saturated aqueous solution of copper sulphate is added to such heated mass and the whole is then stirred until the ingredients of the mass become thoroughly incorporated. Instead of using gelatine in the preparation of the said colloidal substance either casein, agar-agar, isinglass, glue, or colloid silica may be substituted therefor. Similarly, copper chloride may be substituted for copper sulphate in the preparation of the said colloidal substance. Usually it will be found sufficient to employ about 1 lb. of gelatine to 1 lb. of water and a 1 oz. saturated aqueous solution of copper sulphate in the preparation of the colloidal substance.

In coating the treated silk with the colloidal substance the silk may be suitably passed through a bath of the substance and then it is preferably subjected to pressure to have the silk impregnated with the substance as well as to rid it of any excess of the substance adhering thereto.

After the silk has been coated with the colloidal substance and before it has become dried it is subjected to treatment to fumes derived from formalin (40%) for say 3 to 5 days or for any longer time if necessary whereby the film coating of the silk is rendered insoluble. Such fuming operation may be effected in a closed chamber, the coated silk being exposed to the formalin fumes.

When the silk has been treated as described it is found to form an excellent filter for artificial light whereby when such light is projected through the filter no light glare is discernible, shadows are eliminated, and the projected light is diffused without any material reduction in the projection range of the light for illumination purposes. The film or filter when prepared is capable of use for many industrial purposes among which may be mentioned:—motor road vehicle head lamps, street lamps, interior lighting, night tennis lighting, bowling green lighting, lighting of photographic and cinema studios, lighting of mines and tunnels, lighting of surgical operating theatres, lighting of railway carriages, and for searchlights.

To enable the film or filter to be preserved after manufacture and to be utilized for filtering light it may be cut to any suitable size and enclosed between two glass or other suitable transparent covers which covers may be carried in a suitable rim whereby air and moisture are prevented access to the film or filter within the covers.

Figure 2:
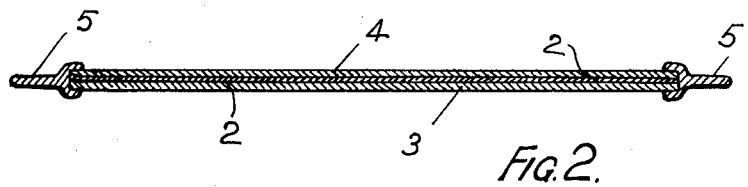

As one example of means for enclosing the manufactured film or filter, the latter is shown on the accompanying drawing as applied to a motor road vehicle headlamp, in which Fig. 1 is a diagrammatic view of a headlamp, and Fig. 2 a sectional view of the lens thereof which consists of a filter prepared in accordance with the invention with enclosed cover.

The body 1 of the lamp may be of usual construction. Instead of the lens thereof consisting of glass it consists of the glass covers 2 and 3 with film or filter 4 prepared as above described set between said covers. A metal rim 5 of any suitable type is fixed to the covers 2 and 3 in such manner that the film or filter 4 will be hermetically sealed between the said covers. Said rim 5 with its assembled covers 2 and 3 and film or filter 4 may be suitably set in the front of the body 1 of the lamp.

What I claim as my invention and desire to secure by Letters Patent is:—

1. A filter for artificial light comprising washed and hardened silk fabric coated with a mixture of gelatine and copper sulphate.

2. A filter for artificial light comprising washed and hardened silk fabric coated with a mixture of gelatine and copper sulphate and rendered insoluble by the exposure to the strong fumes of formaldehyde.

3. A filter for artificial light comprising silk fabric washed in soapy water and hardened in a weak aqueous solution of formaldehyde and coated with a mixture of gelatine and copper sulphate rendered insoluble by exposure to the strong fumes of formaldehyde.

In testimony whereof I affix my signature.

CHARLES HOLUB.